United States Patent
Combier et al.

(10) Patent No.: US 11,009,038 B2
(45) Date of Patent: May 18, 2021

(54) REINFORCED AXIAL DIFFUSER

(71) Applicant: SAFRAN AIRCRAFT ENGINES, Paris (FR)

(72) Inventors: Florent Combier, Moissy-Cramayel (FR); Jean-Claude Belouar, Moissy-Cramayel (FR); Pauline Anne Freche, Moissy-Cramayel (FR); Eric Jean-Paul Guinoiseau, Moissy-Cramayel (FR); Cedric Louis Joseph Laurent, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 95 days.

(21) Appl. No.: 16/603,058

(22) PCT Filed: Apr. 9, 2018

(86) PCT No.: PCT/FR2018/050891
§ 371 (c)(1),
(2) Date: Oct. 4, 2019

(87) PCT Pub. No.: WO2018/185445
PCT Pub. Date: Oct. 11, 2018

(65) Prior Publication Data
US 2020/0072239 A1    Mar. 5, 2020

(30) Foreign Application Priority Data

Apr. 7, 2017 (FR) ...................... 1753055

(51) Int. Cl.
*F04D 29/44* (2006.01)
*F01D 5/14* (2006.01)
(Continued)

(52) U.S. Cl.
CPC .......... *F04D 29/444* (2013.01); *F01D 5/141* (2013.01); *F01D 9/026* (2013.01); *F01D 9/045* (2013.01);
(Continued)

(58) Field of Classification Search
CPC ........ F04D 29/444; F01D 5/141; F01D 9/026; F01D 9/044; F01D 9/045; F05D 2240/122; F05D 2250/71
See application file for complete search history.

(56) References Cited

U.S. PATENT DOCUMENTS 3,719,430 A * 3/1973 Blair ...................... F04D 29/441
                                                         415/207
7,736,126 B2 * 6/2010 Joco ....................... F04D 29/441
                                                         415/144
(Continued)

FOREIGN PATENT DOCUMENTS

EP         2650546 A1    10/2013

OTHER PUBLICATIONS

International Preliminary Report on Patentability received for PCT Patent Application No. PCT/FR2018/050891, dated Oct. 17, 2019, 13 pages (7 pages of English Translation and 6 pages of Original Document).
(Continued)

*Primary Examiner* — Ninh H. Nguyen
(74) *Attorney, Agent, or Firm* — Womble Bond Dickinson (US) LLP

(57) ABSTRACT

The invention relates to a diffuser (5) of a radial or hybrid compressor (2) comprising an internal shroud (20), an external shroud (30) and a series of vanes (10), the trailing edge (12) of each vane (10) being curved in such a way that a distance (di) between the leading edge (11) and the trailing edge (12) of the vane (10) at the mid-height point (h/2) of the
(Continued)

vane (10) is 5% to 15% shorter than a distance (d2) between the leading edge (11) and the trailing edge (12) of the vane (10) at the level of the internal shroud (20), the trailing edge (12) also having an evolving cross section comprising a first part forming a low wall (14) in the vicinity of the external shroud (20) and having a height (H) equal to at most 10% of the height (h) of the vane (10), a curved second part and a third part forming a low wall (14) substantially identical to the first part.

12 Claims, 4 Drawing Sheets

(51) Int. Cl.
*F01D 9/02* (2006.01)
*F01D 9/04* (2006.01)

(52) U.S. Cl.
CPC .. *F05D 2240/122* (2013.01); *F05D 2250/141* (2013.01); *F05D 2250/71* (2013.01); *F05D 2260/941* (2013.01)

(56) References Cited

U.S. PATENT DOCUMENTS

| | | | |
|---|---|---|---|
| 8,122,724 B2* | 2/2012 | Slovisky | F04D 27/0238 |
| | | | 60/772 |
| 8,926,276 B2* | 1/2015 | Japikse | F01D 5/145 |
| | | | 415/208.3 |
| 2005/0220616 A1 | 10/2005 | Vogiatzis et al. | |
| 2017/0097010 A1 | 4/2017 | Japikse | |

OTHER PUBLICATIONS

International Search Report and Written Opinion received for PCT Patent Application No. PCT/FR2018/050891, dated Aug. 8, 2018, 16 pages (7 pages of English Translation and 9 pages of Original Document).

Preliminary Research Report received for French Application No. 1753055, dated Dec. 7, 2017, 3 pages (1 page of French Translation Cover Sheet and 2 pages of original document).

\* cited by examiner

REINFORCED AXIAL DIFFUSER

FIELD OF THE INVENTION

The invention generally relates to the gas turbine engines, and more particularly to an axial diffusion stage of a radial or mixed-flow compressor of a gas turbine.

TECHNOLOGICAL BACKGROUND

A compressor comprises one or more rotating disks (rotor or impeller), vaned or not and one or more wheels with fixed vanes (stator vane stages).

A radial (or centrifugal) compressor has at least one radial compression stage, that is to say capable of producing a flow of gas perpendicular to the central axis of the compressor. It comprises at least one impeller with radial vanes that suck air axially, which, under the effect of the radial force, is accelerated, compressed and discharged radially. This air is then straightened in a diffuser (fixed vane assembly) which transforms part of its velocity into static pressure by slowing down the gases at the outlet of the impeller.

The gases are then guided towards the combustion chamber.

A mixed-flow (or helico-radial) compressor has at least one compression stage inclined with respect to the central axis, so that the fluid exits the impeller of the compressor at a non-zero angle with the radial direction.

A diffuser of a radial compressor is composed of a wheel which is formed of two flanges between which the gases flow radially or which is inclined from the center towards the periphery. Generally, the diffuser comprises, from upstream to downstream in the direction of flow of the gases in the compressor, a radial portion and an axial portion 5. Fins 10' are distributed between the flanges all along the wheel, in the radial portion and in the axial portion of the diffuser. These fins 10' form a flow cascade between the leading edges of these fins 10' and their trailing edge.

The axial portion 5 of the diffuser is generally formed by soldering of three assemblies: an outer shroud, an inner shroud and the fins. The outer shroud and the inner shroud form the downstream (and axial) portion of the flanges of the diffuser.

However, it has been observed that, in operation, circumferential cracks 7 could be formed at the trailing edge of the fins 10' after a number of cycles. These cracks 7 start then from the solder radius 8 extending between the fin 10' and one of the shrouds 20' (the inner shroud in FIG. 1) and then propagate circumferentially in the fin and in the shrouds 20'. These cracks 7 appear due to the high vibratory stresses experienced by the diffuser and are amplified by the very small solder radius 8, which induces a local over-load. However, the geometry of the solder radius 8 is difficult to control industrially insofar as it depends on a manual operation (deposition of the solder paste 9) and therefore has large dispersions in production.

By solder radius 8 is meant the fillet formed by the solder paste 9 deposited between the fin 10' and the slit formed in the shroud 20' after the paste 9 has flowed by capillarity, under the effect of the heat. Such a solder radius 8 is for example illustrated in FIG. 1.

SUMMARY OF THE INVENTION

An object of the invention is therefore to propose a solution for limiting the risks of damaging an axial diffuser for a radial or mixed-flow compressor and particularly for making the diffuser more tolerant to the vibratory stresses and to the dispersions of values of the solder radius.

To this end, the invention proposes a diffuser of a radial or mixed-flow compressor comprising an inner shroud, an outer shroud and a series of fins extending radially with respect to an axis of revolution of the diffuser between the inner shroud and the outer shroud. Each fin has a leading edge, a trailing edge opposite to the leading edge and a height corresponding to a minimum dimension of the fin, along a radial direction with respect to the axis of the diffuser, between the inner shroud and the outer shroud at the fin.

The trailing edge of each fin is curved so that a distance between the leading edge and the trailing edge of the fin substantially at mid-height of the fin is 5% to 15% shorter than a distance between the leading edge and the trailing edge of the fin at the inner shroud.

Some preferred but non-limiting features of the diffuser described above are as follows:
- the distance between the leading edge and the trailing edge of the fin at mid-height of the fin is 10% to 15% shorter than the distance between the leading edge and the trailing edge of the fin at the inner shroud,
- the trailing edge has a radius of curvature that is smaller in the vicinity of the inner shroud and of the outer shroud than a radius of curvature at mid-height of the fin,
- the radius of curvature of the trailing edge in the vicinity of the inner shroud and of the outer shroud is at least twice smaller than the radius of curvature of the trailing edge at mid-height of the fin,
- the trailing edge has a variable cross-section comprising a first portion forming a wall in the vicinity of the outer shroud and having a substantially constant height equal to at most 10% of the height of the fin, a second curved portion and a third portion forming a wall substantially identical to the first portion,
- the inner shroud and the outer shroud each have: an inner face extending facing the fin, an outer face opposite to the inner face, and an upstream edge and a downstream edge, the upstream and the downstream being defined by the direction of flow of the gases in the diffuser, the outer face of the outer shroud and of the inner shroud each having an extra thickness at each fin, said extra thickness extending at least between the downstream edge of the associated shroud and a projection of the trailing edge of the fin on said outer face,
- the extra thickness of the inner shroud and/or of the outer shroud further extends on either side of the associated slit housing the fin,
- the extra thickness extends over at most one third of a length of the associated slit of the inner shroud and/or of the outer shroud, said length corresponding substantially to the distance between the leading edge and the trailing edge of the fin at the inner shroud,
- the extra thickness extends to a distance in the order of 2 mm from the slit of the associated shroud, and/or
- the extra thickness (28, 38) has a V or Y shape.

The invention also proposes a radial or mixed-flow compressor comprising such a diffuser as well as a motor comprising this radial or mixed-flow compressor.

SHORT DESCRIPTION OF THE DRAWINGS

Other features, objects and advantages of the present invention will become more apparent upon reading the following detailed description, and in relation to the appended drawings given by way of non-limiting examples and wherein.

DETAILED DESCRIPTION OF ONE EMBODIMENT

Figure 1:
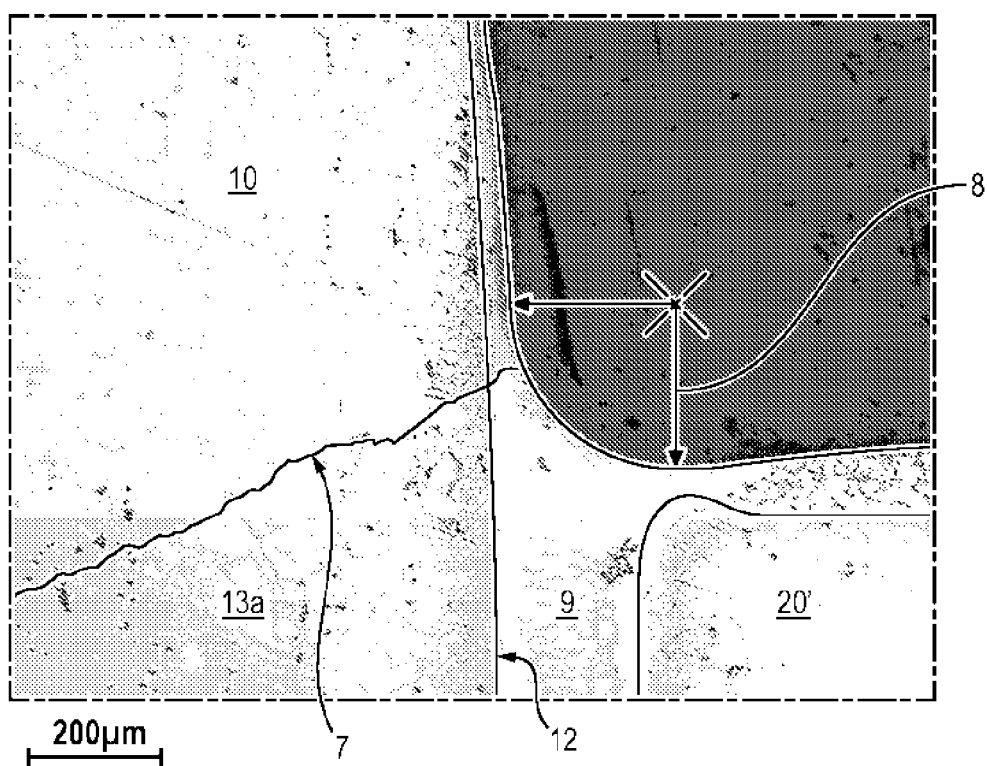
FIG. 1 illustrates a partial cross-sectional view of the trailing edge of a fin fixed by soldering at its root in the slit of an inner shroud of a conventional distributor, on which an example of crack initiated at the solder radius and propagating in the fin, is visible.

An axial diffuser 5 according to the present invention is in particular intended to be used with a of radial or mixed-flow type compressor.

In the case of a radial compressor, a gas stream is first sucked into an air intake sleeve and then compressed between the blades of an impeller of the radial compressor and its casing. The compressor is of axial symmetry about an axis. The compressed gas stream then exits the impeller radially. If the compressor was a mixed-flow compressor, the gas stream would exit inclined at a non-zero angle with respect to a direction radial to the axis.

The compressed air exits the impeller radially while having a kinetic moment and passes into a diffuser 5 of the compressor. The role of the diffuser 5 is to convert a portion of the kinetic energy of the gases from the compressor into static pressure by slowing down the gas velocity and to straighten the flow derived from the impeller. It comprises for this purpose in particular an axial portion and a plurality of fins 10 disposed along its circumference, which extend between an inner shroud 20 and an outer shroud 30.

Each of the fins 10 has, in known manner, a leading edge 11 disposed facing a gas flow in the diffuser 5, a trailing edge 12 opposite to the leading edge 11, a root 13a fixed by soldering in a slit 21 of the inner shroud 20, a head 13b fixed by soldering in a slit 31 of the outer shroud 30 and a height h corresponding to a minimum dimension of the fin 10 along a radial direction with respect to the axis of the diffuser, between the inner shroud 20 and the outer shroud 30 at the fin 10. Generally, the height h corresponds to the height of the leading edge 11 of the fin 10.

In order to reduce the risks of formation of cracks, the trailing edge 12 of each fin 10 is curved so that a distance $d_1$ between the leading edge 11 and the trailing edge 12 of the fin 10 at mid-height h/2 of the fin 10 is 5% to 15% shorter than a distance $d_2$ between the leading edge 11 and the trailing edge 12 of the fin 10 at the inner shroud 20 (the latter distance $d_2$ being often referred to as "chord").

The trailing edge 12 thus has a curved shape in the manner of a crescent or a half-moon. This curved shape can be achieved either by removal of material by machining, for example, a conventional diffuser 5 fin 10, or directly by casting during the manufacture of the fin 10.

Preferably, the distance $d_1$ between the leading edge 11 and the trailing edge 12 of the fin 10 at mid-height h/2 of the fin 10 is 10% to 15% shorter than the chord.

This geometry thus makes it possible to discharge the solder radius 8 at the trailing edge 12 of the fins 10 by modifying the force path and by strongly softening the trailing edge 12. The Applicant has found that the critical area likely to be damaged because of the strong vibratory stresses remained at the solder radius 8 but that the specific geometry of the trailing edge 12 (curve over at least part of its height h) allowed to shift this critical area towards the upstream, in an area where the fin 10 is thicker and where the solder radius 8 is larger. This also makes it possible to reduce generally the static and dynamic loads of the diffuser 5.

Note that the impact of modification of the length of the fin 10 (i.e., the distance $d_1$ between the leading edge 11 and the trailing edge 12) at mid-height h/2 of the fin 10 is aerodynamically acceptable, i.e., the fin 10 remains capable of sufficiently straightening the flow and slowing down the velocity of the gases at the outlet of the compressor impeller.

In one embodiment, the trailing edge 12 of the fins 10 has a radius of curvature R1 that is smaller in the vicinity of the inner shroud 20 and of the outer shroud 30 than at mid-height h/2 of the fin 10. For example, the radius of curvature R1 in the vicinity of the inner shroud 20 and of the outer shroud 30 is at least two times smaller, for example four times smaller, than the radius of curvature R2 at mid-height h/2 of the fin 10.

This makes it thus possible to maintain a minimum distance at mid-height h/2 of the fin 10 between its leading edge 11 and its trailing edge 12 (and therefore the aerodynamic impact on the fin 10) while discharging sufficiently the solder radius 8. Indeed, it will be understood that, when the radius of curvature of the curved portion of the trailing edge 12 is constant over the entire height h of the fin 10, the distance $d_1$ at mid-height h/2 between the leading edge 11 and the trailing edge 12 is necessarily shorter than when the radius of curvature is greater over at least part of the height h of the fin 10.

For example, for a fin 10 having a height h in the order of ten millimeters and a chord $d_2$ of about thirty millimeters, the radius of curvature R1 of the curved portion of the trailing edge 12 may be in the order of 1.5 mm in the vicinity of the inner shroud 20 and of the outer shroud 30 and then increase up to a radius of curvature R2 in the order of 6 mm, so that the distance $d_1$ is 3.8 mm shorter than the chord $d_2$ of this fin 10. Thus, at mid-height h/2 of the fin 10, the trailing edge 12 of a fin 10 of a diffuser 5 according to the invention extends to about 3.8 mm from the trailing edge 12' of a conventional fin 10' (which is therefore devoid of curved portion and represented in dashed lines in FIGS. 2 and 3).

In one embodiment, the transition between the small radius of curvature R1 and the large radius of curvature R2 of the curved portion of the trailing edge 12 is gradual.

Figure 2:
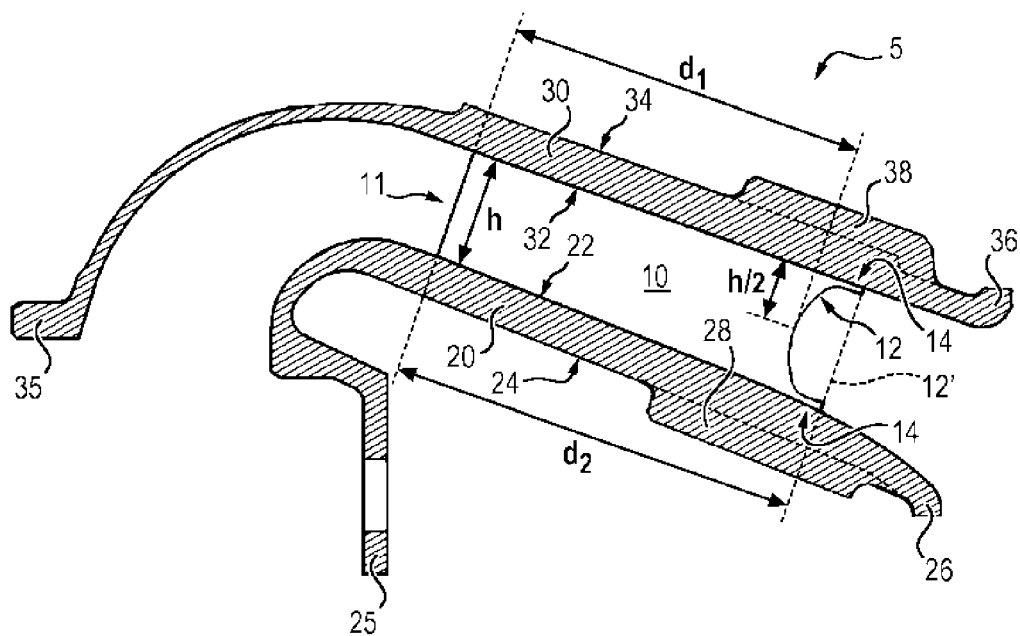
FIG. 2 illustrates a partial cross-sectional view of one example of embodiment of a fin and associated shrouds of an axial diffuser according to the invention, in which a fin and the associated shrouds of an axial diffuser according to the prior art, have been represented in dotted lines.
Figure 3:
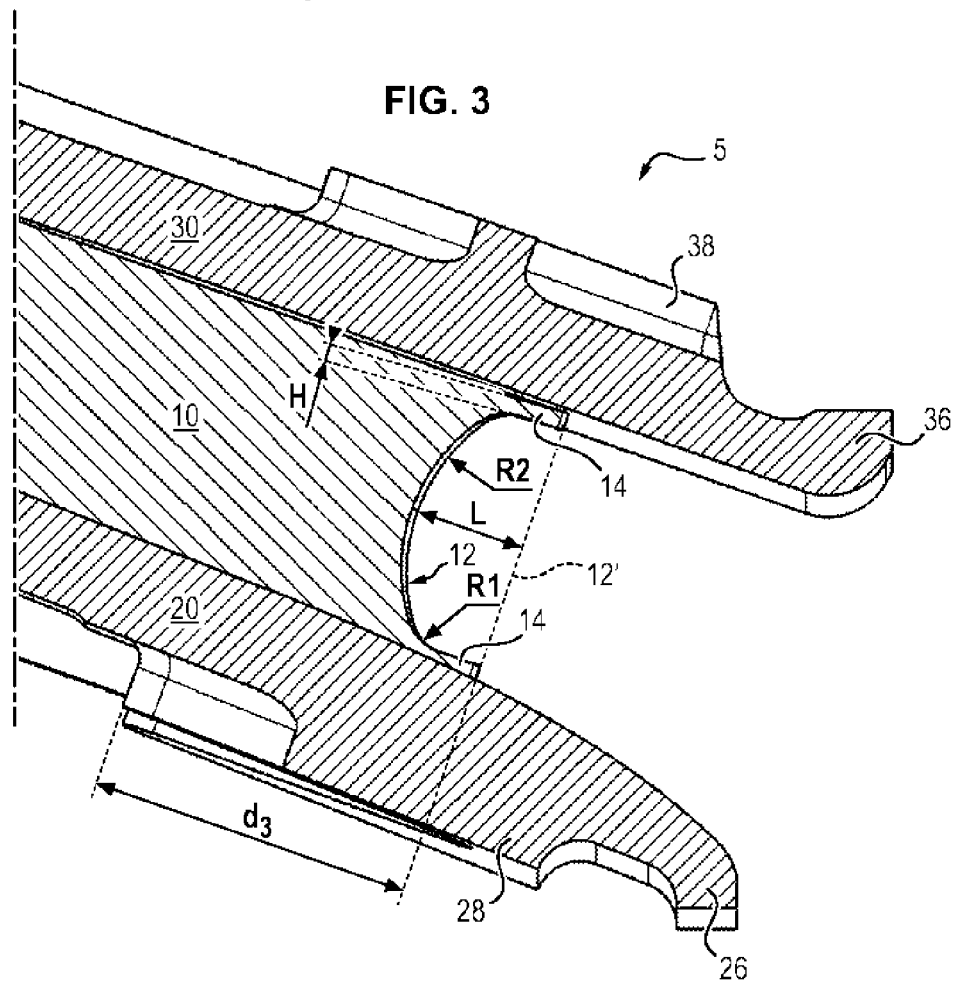
FIG. 3 is a side view with more detail of the example of embodiment of FIG. 2.

As can be seen in FIGS. 2 and 3, the trailing edge 12 may be curved only over one portion only of the height h of the fin 10. For example, the trailing edge 12 may have a variable cross-section comprising a first portion forming a wall 14 in the vicinity of the outer shroud 30 and having a substantially constant height H, a second portion corresponding to the curved portion and a third portion forming a wall 14 in the vicinity of the inner shroud 20 substantially identical to the first portion.

The height H of the walls 14 is substantially constant between the downstream end of the trailing edge 12 and the beginning of the second portion (the curved portion). For example, the height H of the walls 14 may be substantially constant over an axial length of about 1.5 mm.

Figure 5:
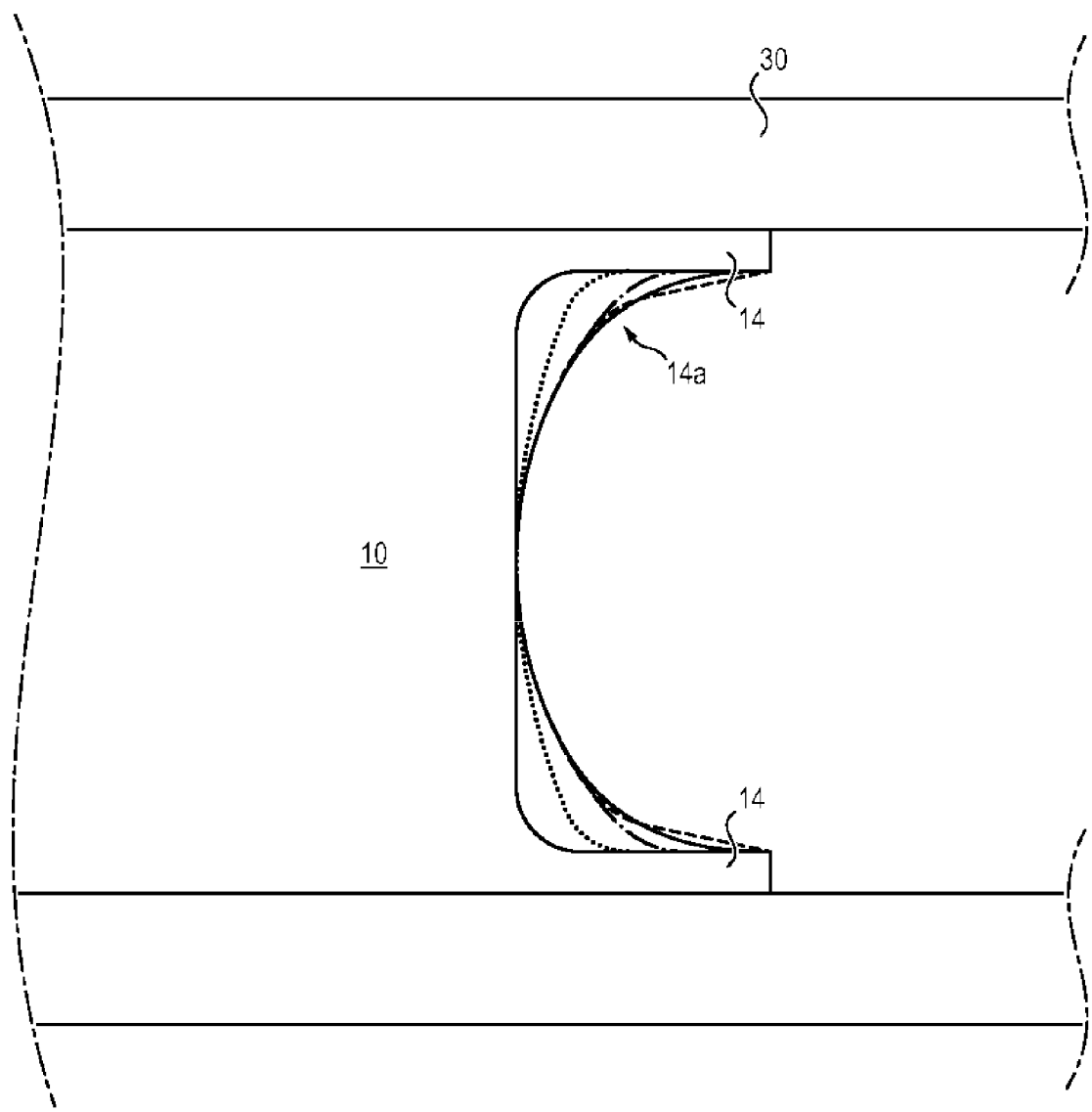
FIG. 5 is a partial and schematic cross-sectional view of an (outer or inner) shroud of an axial diffuser on which several examples of embodiment of walls whose height is constant or changing, are represented.

Alternatively (see FIG. 5), the height H of the walls 14 is changing. For example, as illustrated in FIG. 5, the height H may be comprised between 0.6 mm at the downstream end of the trailing edge 12 and of about 1.0 mm at the beginning of the second portion (see the curve indicated by the reference 14a).

The height H of each wall 14 is at most equal to 10% of the height h of the fin 10. Thus, in the example given above, the height H of each wall 14 is less than one millimeter, for example in the order of 0.6 mm.

The trailing edge 12 therefore remains curved over a substantial portion of the height h of the fin 10, here over at least 90% of its height h.

In this embodiment, the curved portion of the trailing edge 12 therefore starts from the walls 14 and not from the inner shroud 20 and the outer shroud 30.

The formation of walls 14 at the trailing edge 12 makes it possible to obtain a continuous solder fillet between the fins 10 and the shrouds 20, 30 all along the fin 10, up to the trailing edge 12. There is indeed no discontinuity likely to be detrimental to the mechanical strength or to the aerodynamics. The walls 14 further facilitate the manufacture of the diffuser 5 and in particular the assembly of the fins 10 with the shrouds 20, 30 before their soldering. The walls 14 allow indeed a radial wedging tolerance of the fins 10 in the slits 21, 31 that is greater than when the trailing edge 12 is curved over the entire height h of the fins 10 and devoid of walls 14. Indeed, even in the case of a radial positioning at the maximum of tolerance, the wall 14 will not be set back with respect to the flowpath (it will always open into the flowpath) and therefore will not create a discontinuity in the flowpath (negative offset).

The inner shroud 20 and the outer shroud 30 each have an inner face 22, 32, extending facing the fin 10, and an outer face 24, 34 opposite to the inner face 22, 32. The inner faces 22, 32 of the inner shroud 20 and of the outer shroud 30 are therefore facing each other and delimit together the flowpath of the gas flow in the diffuser 5.

The inner shroud 20 and the outer shroud 30 further comprise each an upstream edge 25, 35 and a downstream edge 26, 36, the upstream and the downstream being defined by the direction of flow of the gases in the diffuser 5.

Optionally, in order to further reduce the static and dynamic loads at the solder radius 8 and to improve the frequency positioning of the eigenmodes of the diffuser 5, the outer face 24, 34 of the inner shroud 20 and of the outer shroud 30 can each have, at each fin 10, an extra thickness 28, 38. This extra thickness 28, 38 then extends at least between a projection of the trailing edge 12 of the fin 10 on said outer face 24, 34 and the downstream edge 26, 36 of the associated shroud 20, 30. If necessary, the extra thickness 28, 38 may extend beyond the projection of the trailing edge 12.

The extra thickness 28, 38 may extend up to the downstream edge 26, 36 of the associated shroud 20, 30, in which case said extra thickness 28, 38 may be partly achieved in the mounting flange usually used for the machining of the shroud 20, 30. Alternatively, the extra thickness 28, 38 may stop in the vicinity of the mounting flange without including it.

The extra thickness 28, 38 is out of the flowpath and therefore does not interfere with the flow of gases in the diffuser 5.

In one embodiment, the extra thickness 28, 38 may further be prolonged so as to extend on either side of the slits 21, 31 housing the fins 10. For example, the extra thickness 28, 38 may extend along each slit 21, 31 over a distance $d_3$ at most equal to one third of the chord $d_2$ of the fin 10.

The extra thickness 28, 38 may have a thickness (corresponding to the dimension along the radial direction with respect to the axis of revolution of the diffuser 5) comprised between 0.5 and 2 mm, i.e. between 10% and 100% of the initial thickness of the shroud 20, 30

In order to allow the deposition of the solder paste 9 in order to fix the fin 10 in the slit 21, 31 while reducing the dynamic and static loads of the diffuser 5, the extra thickness 28, 38 extends to a distance in the order of two millimeters from the edge of each slit 21, 31.

The extra thickness 28, 38 may for example have a V or Y shape.

Figure 4A:
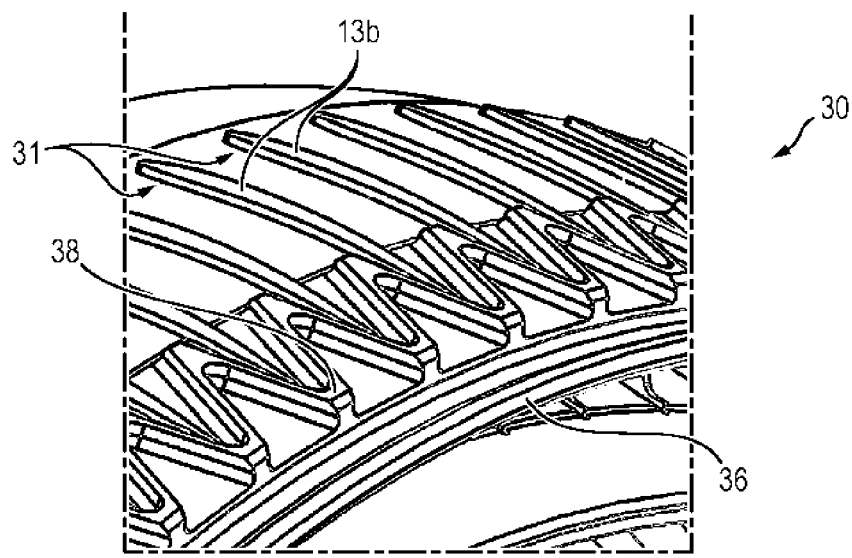
FIGS. 4a and 4b are perspective views of an outer shroud and of an inner shroud, respectively, of an axial diffuser, on which examples of embodiment of extra thicknesses according to the invention, are visible.
Figure 4B:
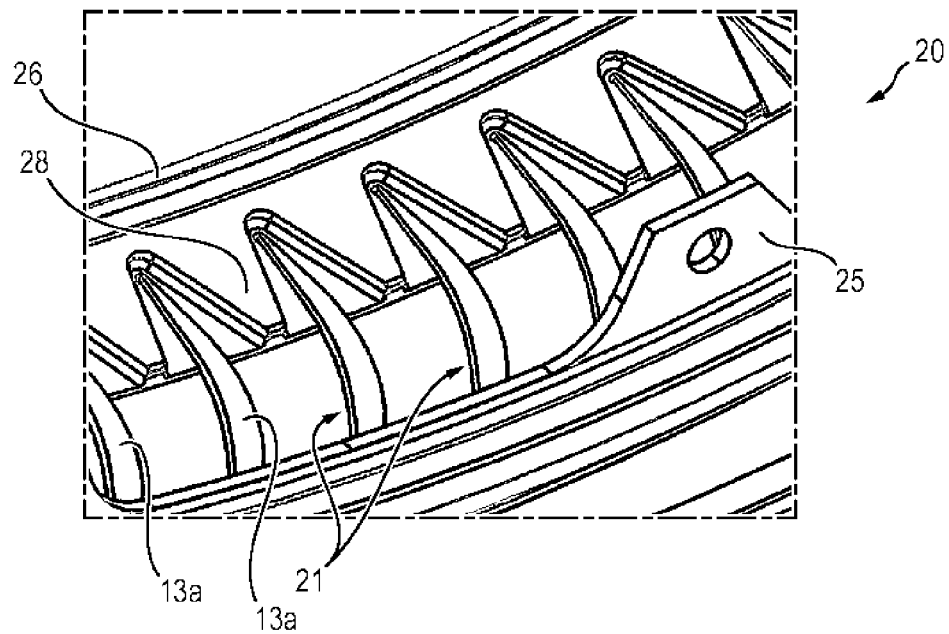

Examples of extra thickness 28, 38 have for example been illustrated in the appended FIGS. 4a and 4b.

As can be seen in the appended FIG. 4a, the extra thickness 38 of the outer shroud 30 may have the form of V-shaped slots. These slots may in particular be made by machining of the outer shroud 30 from the downstream edge on the one hand, in order to form the V-shaped downstream ridges and then from the upstream edge 35 on the other hand, in order to form V-shaped upstream ridges.

The inner shroud 20 may have an extra thickness 28 of shape and dimensions identical to those of the outer shroud 30. However, for reasons of feasibility and particularly access to the upstream edge 25, it is possible to produce only the downstream edges, with the possibility of leaving the upstream material (see FIG. 4b).

The invention claimed is:

1. A diffuser of a radial or mixed-flow compressor comprising an inner shroud, an outer shroud and a series of fins extending radially with respect to an axis of revolution of the diffuser between the inner shroud and the outer shroud, each fin having a leading edge, a trailing edge opposite to the leading edge and a height (h) corresponding to a minimum dimension of the fin, along a radial direction with respect to the axis of the diffuser, between the inner shroud and the outer shroud at the fin, wherein the trailing edge of each fin is curved so that a distance ($d_1$) between the leading edge and the trailing edge of the fin substantially at mid-height (h/2) of the fin is 5% to 15% shorter than a distance ($d_2$) between the leading edge and the trailing edge of the fin at the inner shroud, and wherein the trailing edge has a variable cross-section comprising a first portion forming a wall in the vicinity of the outer shroud and having a height equal to at most 10% of the height (h) of the fin, a second curved portion and a third portion forming a wall substantially identical to the first portion.

2. The diffuser according to claim 1, wherein the distance ($d_1$) between the leading edge and the trailing edge of the fin at mid-height (h/2) of the fin is 10% to 15% shorter than the distance ($d_2$) between the leading edge and the trailing edge of the fin at the inner shroud.

3. The diffuser according to claim 1, wherein the trailing edge has a radius of curvature (R1) that is smaller in the vicinity of the inner shroud and of the outer shroud than a radius of curvature (R2) at mid-height (h/2) of the fin.

4. The diffuser according to claim 3, wherein the radius of curvature (R1) of the trailing edge in the vicinity of the inner shroud and of the outer shroud is at least twice smaller than the radius of curvature (R2) of the trailing edge at mid-height (h/2) of the fin.

5. The diffuser according to claim 1, wherein the height of the wall in the first portion is substantially constant.

6. The diffuser according to claim 1, wherein the height of the wall in the first portion is changing.

7. The diffuser according to claim 6, wherein the height of the wall is comprised between 0.6 mm at a downstream end of the trailing edge of the fin and of about 1.0 mm at the beginning of the second portion.

8. The diffuser according to claim 1, wherein the inner shroud and the outer shroud each have:
- an inner face extending facing the fin,
- an outer face opposite to the inner face, and
- an upstream edge and a downstream edge, wherein upstream and downstream are defined by the direction of flow of the gases in the diffuser,
- the outer face of the outer shroud and of the inner shroud each having an extra thickness at each fin, said extra thickness extending at least between the downstream edge of the associated shroud and a projection of the trailing edge of the fin on said outer face.

9. The diffuser according to claim 8, wherein, the extra thickness of the inner shroud and/or of the outer shroud further extends on either side of the associated slit housing the fin.

10. The diffuser according to claim 8, wherein the extra thickness extends over at most one third of a length of the associated slit of the inner shroud and/or of the outer shroud, said length corresponding substantially to the distance ($d_2$) between the leading edge and the trailing edge of the fin at the inner shroud.

11. The diffuser according to claim 9, wherein the extra thickness extends to a distance in the order of 2 mm from the slot of the associated shroud.

12. The diffuser according to claim 8, wherein the extra thickness has a V or Y shape.

\* \* \* \* \*